Nov. 13, 1934.  W. B. PARKER  1,980,427
APPARATUS FOR USE IN CONTROLLING PLANT PESTS AND PLANT DISEASES
Filed June 24, 1932    4 Sheets-Sheet 1
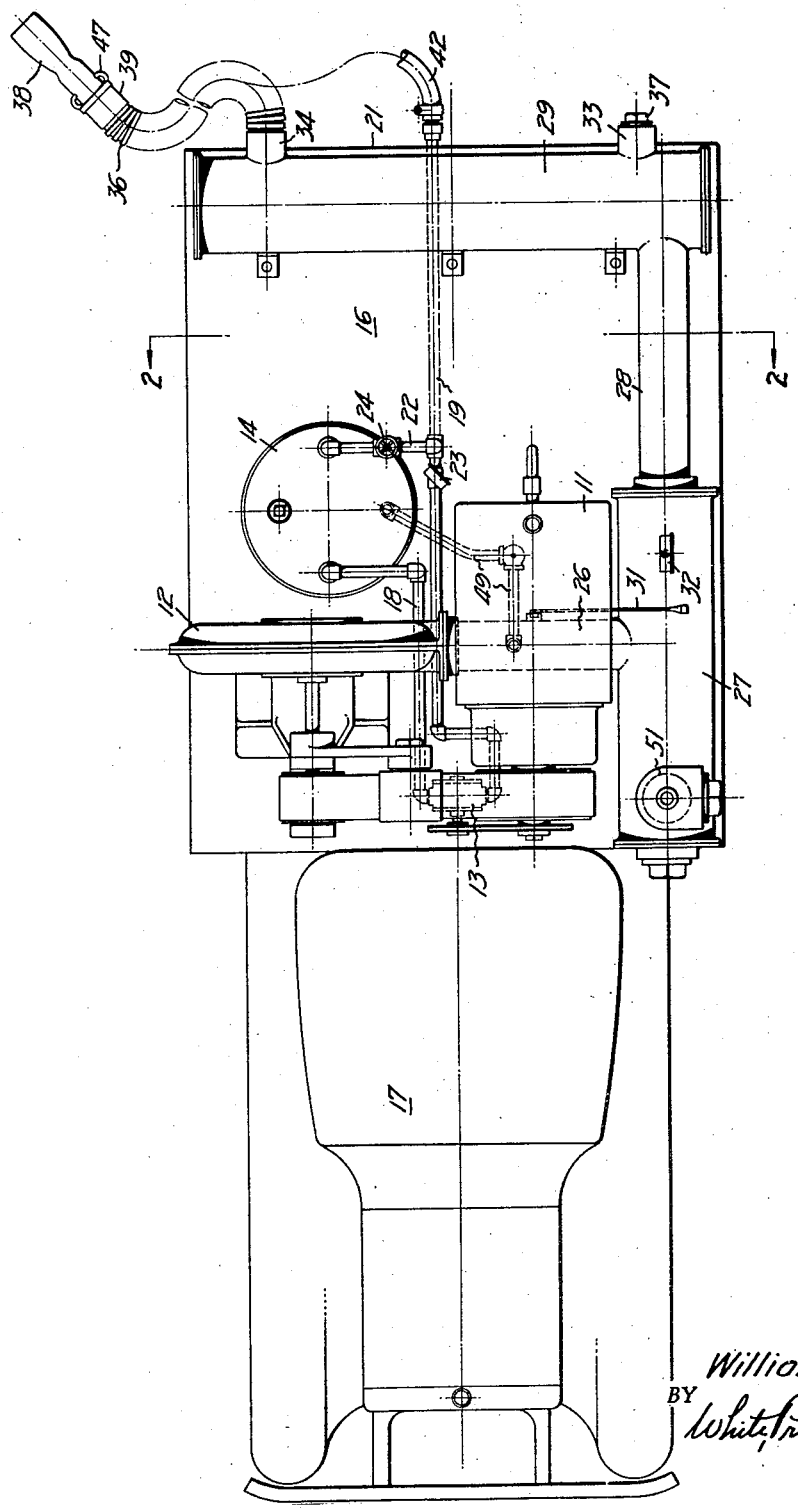
INVENTOR.
William B. Parker
BY
ATTORNEYS.

Nov. 13, 1934. W. B. PARKER 1,980,427
APPARATUS FOR USE IN CONTROLLING PLANT PESTS AND PLANT DISEASES
Filed June 24, 1932  4 Sheets-Sheet 2
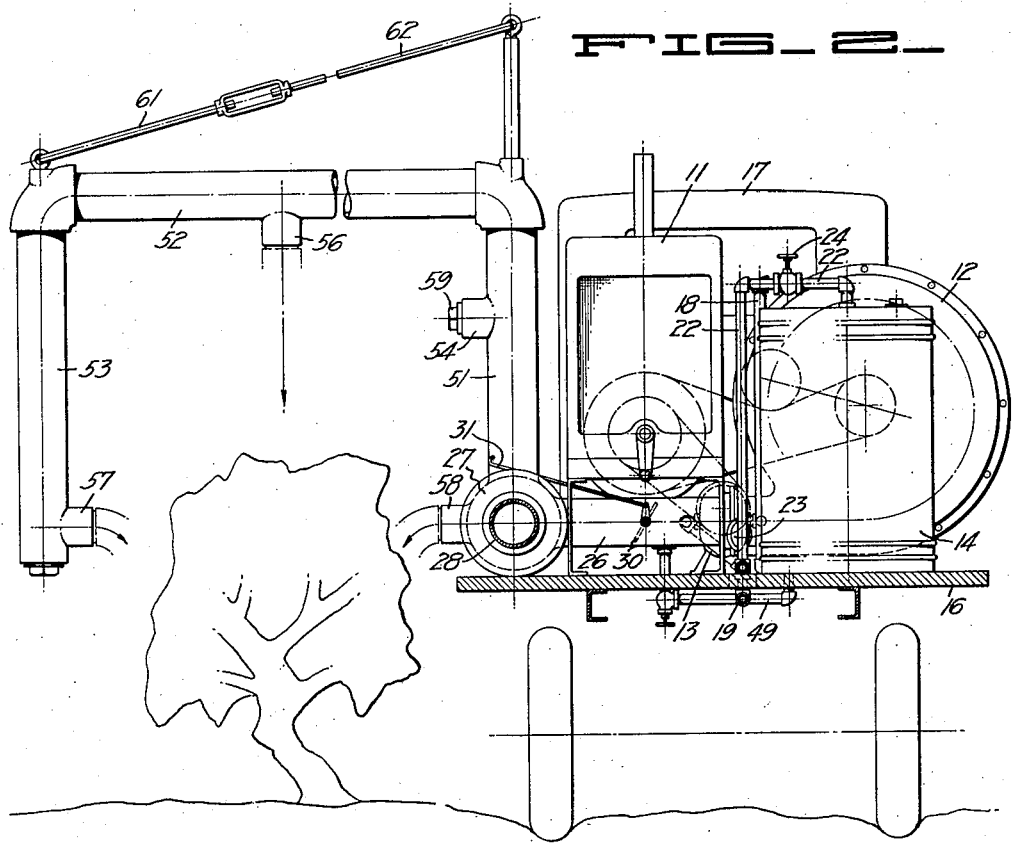
INVENTOR.
William B. Parker
BY
White, Prost, Flehr & Lothrop
ATTORNEYS.

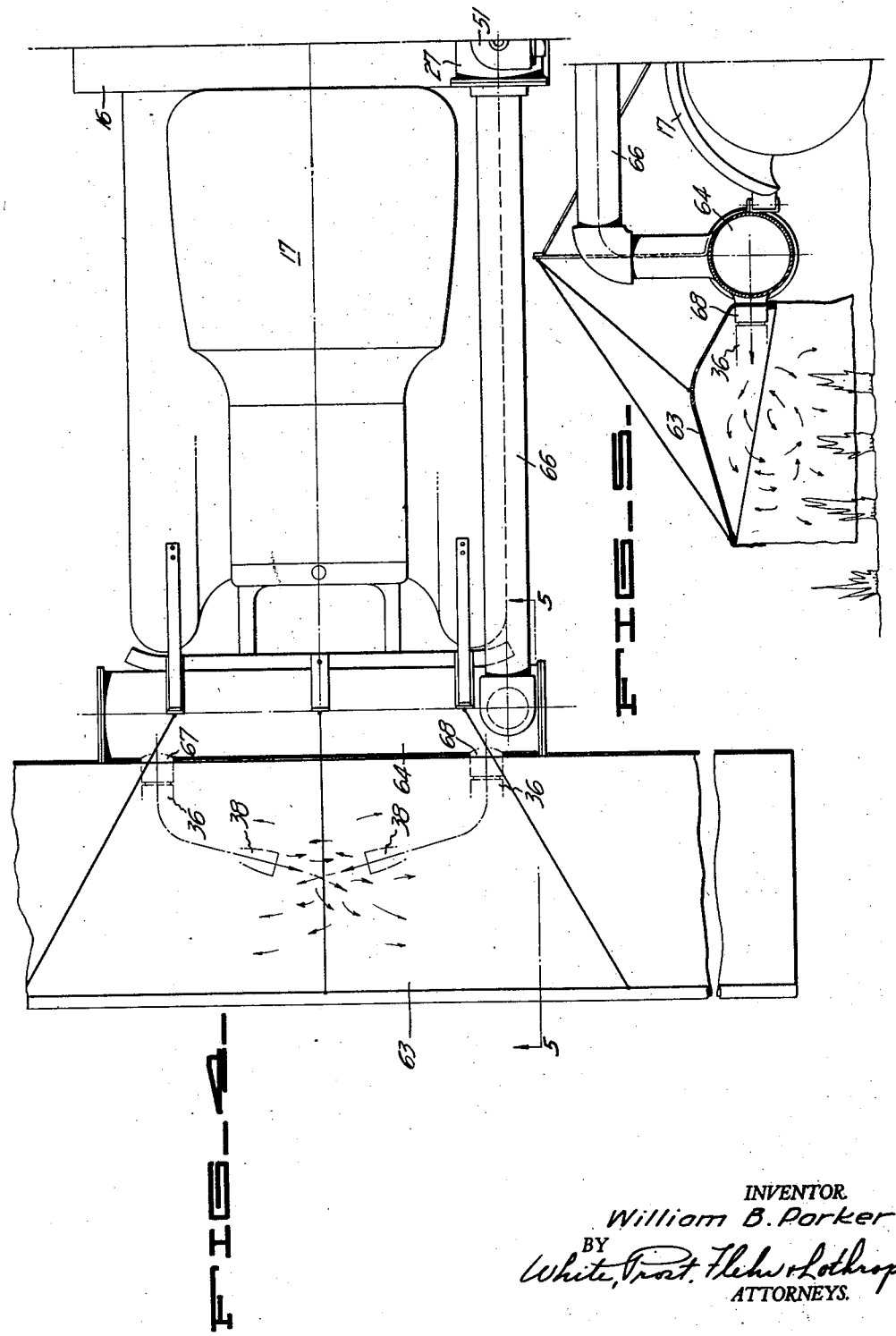

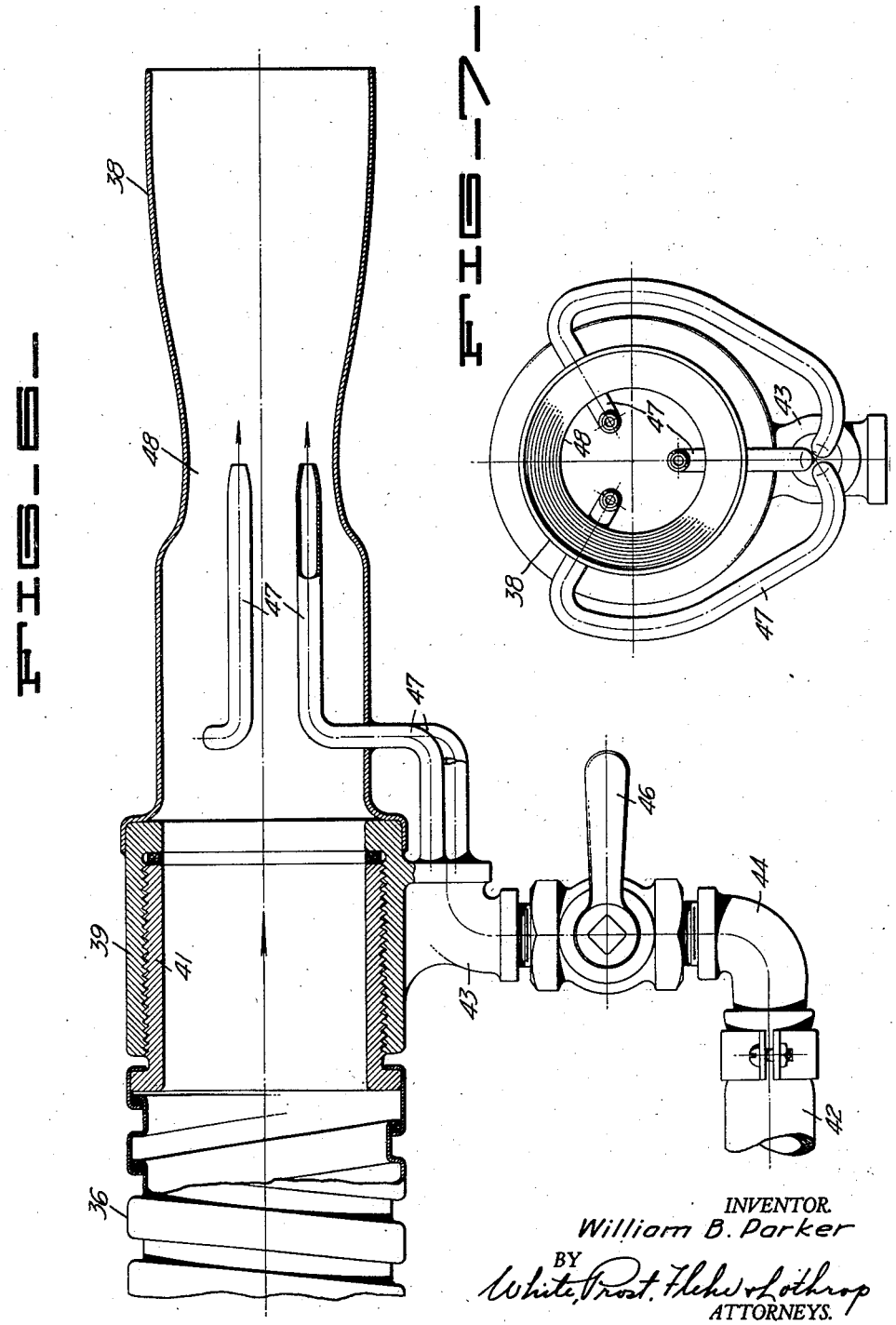

Patented Nov. 13, 1934

1,980,427

UNITED STATES PATENT OFFICE 1,980,427

APPARATUS FOR USE IN CONTROLLING PLANT PESTS AND PLANT DISEASES

William B. Parker, Placerville, Calif., assignor to California Spray-Chemical Corporation, Berkeley, Calif., a corporation of Delaware Application June 24, 1932, Serial No. 619,109

1 Claim. (Cl. 299—46)

The invention generally relates to means for applying insecticidal or fungicidal materials to plants, trees, vegetation or the like, and more particularly relates to apparatus adapted to apply effective amounts of either of said materials simultaneously to a plurality of plants or trees in a tract or area thereof.

It is an object of the invention to provide apparatus for applying adequate amounts of pest or fungus destructive materials to pest infested or diseased growth in a minimum of time, with a minimum of labor, without waste of materials and without injury to the treated growth.

Another object of the invention is to provide apparatus of the aforementioned character which is simple to operate and to control, and which can be economically employed.

Other objects of the invention, together with some of the advantageous features thereof, will appear from the following description of preferred embodiments of the invention. While I have illustrated the preferred forms of the apparatus in the drawings, it is to be understood that I am not to be limited to such forms, as my invention, as defined in the appended claim, can be embodied in a plurality and variety of forms.

In the drawings:

Figure 1 is a plan of one embodiment of my invention.

Figure 2 is a sectional elevation of a modification of the embodiment of my invention which is illustrated in Figure 1.

Figure 3 is a diagrammatic plan of a portion of the embodiment of the invention which is shown in Figure 2.

Figure 4 is a plan of a portion of a modified form of the invention.

Figure 5 is an elevation, partly in section, of the modified embodiment of the invention which is illustrated in Figure 4.

Figure 6 is an elevation, partly in cross section, of the nozzle and some of the pipe connections employed in the apparatus.

Figure 7 is a view looking into the nozzle which is shown in Figure 6.

I am familiar with substantially all of the various devices in present use for applying liquid insecticidal or fungicidal materials to plants. Probably the most common devices employed are the conventional spray guns, hand or power operated, which apply the liquid by forcing the same under pressure ranging from approximately 50 to approximately 400 pounds per square inch through atomizing nozzles. Another spray-producing device in general use is the so-called paint gun, which operates on the principle of aspirating the liquid material from a container by and into a blast or stream of air under pressure ranging from 30 to 100 pounds per square inch.

The use of these aforementioned spray devices has proven unsatisfactory in many respects. Not only has there been inefficient control of pests and fungi as well as waste of materials, but serious injury to the treated growth frequently has occurred when sprayed with a concentrated or unemulsified material, either phytocidal or non-phytocidal, because of drenching. Further, relatively large areas of infested or diseased growth, such as vineyards and orchards, cannot be treated with the use of these devices in a practical length of time. Inefficient pest or fungus control, waste of materials, and injury to the plants are resultants of the character of the sprays produced by these devices. The created sprays often contain some liquid particles so small as to vanish in the atmosphere without depositing upon the surfaces of the growth, or contain particles of such large size as to drop rapidly due to the influence of gravity before the spray reaches the growth. Hence, material is wasted, the coverage of the growth with material being at most blotchy. Moreover, the sprays produced by these devices frequently are so dense; that is, contain a relatively large number of liquid particles per unit volume of the spray, that the foliage of the growth, when treated with concentrated or unemulsified material, is drenched, and, as a result, is suffocated. The spray devices cannot be economically employed in treating relatively large tracts of infested or diseased growth for the reasons that the created sprays have no floating or sustaining qualities, and therefore do not drift through the foliage of a number of plants or trees, nor are the sprays growth-enveloping in character. Hence each and every plant or tree in a tract thereof not only must be separately sprayed or treated, but the sprays must be directed at each plant from a number of different positions in order to ensure complete coverage of the growth. This is a cumbersome mode of applying the material and requires either a considerable amount of time or the employment of a large force of men to do the work.

Another device which has been developed for applying liquid insecticidal or fungicidal material to pest-infested or diseased growth is the so-called "cold steam" apparatus, which comprises means, including a boiler and a Venturi nozzle, for liberating over the growth a steam created fog-like mist containing a vaporized oily insecticidal or fungicidal material, separately or in combination with microscopic particles of a powdered toxic material. The inclusion of a boiler in the apparatus renders the same hazardous to employ and further, because of the size of the boiler necessary for efficient use, it is impractical, in so far as rapid, large scale work is concerned, to adapt the apparatus to portable outfits. Moreover, the control of pests has been unsatisfactory with the use of this equipment for the primary reason that the liberated particles of insecticidal material are surrounded by a water phase, due to condensation of the steam, and pests are not readily wetted with the active insecticidal ingredient. Another disadvantage of the use of this apparatus is that the liquid particles in the cloud or fog-like mist become so fine upon the evaporation of the water phase that they do not adhere to the surfaces of the growth but vanish rapidly into the atmosphere.

The preferred embodiment of my invention comprises a nozzle, means for causing a relatively large volume of a gas, non-condensible at normal atmospheric temperatures and pressures, such as air, to flow through and from said nozzle at a relatively high velocity and under a relatively low pressure, preferably, respectively 200 to 600 miles per hour and one-quarter to two pounds per square inch, together with means for introducing and distributing in the gas or air and substantially at the point of highest velocity thereof while passing through said nozzle, a liquid insecticidal or fungicidal material, separately or in combination, respectively, with a powdered insecticidal or fungicidal material, whereby the liquid, or the admixture of liquid and powdered material, is broken up into finely divided particles which are diffused or spread in the gas or air and carried thereby in the form of a floating growth-enveloping cloud or fog-like mist; the particles being of such size as to deposit in a thin, even film upon all portions of the treated growth, including both sides of the foliage thereof.

The apparatus herein disclosed is designed to carry out the method which is described in my co-pending application Serial No. 635,861, filed on October 1, 1932, and entitled "Method of controlling plant pests and plant diseases".

In accordance with my invention, I provide a prime mover 11, such as a conventional gas engine, a blower 12 which is connected to and driven by the prime mover, a pump 13 also connected to and driven by the prime mover, and a tank 14 for carrying an insecticidal liquid or an admixture of such liquid and a powdered insecticidal material which is to be liberated over the plants or trees. These units conveniently can be arranged in a group and supported upon a platform 16, such as the floor of the truck body of an automotive or other vehicle 17.

The apparatus also includes a pipe connection 18 leading from the tank 14 to the pump 13, an outlet pipe 19 leading from the pump 13 and terminating adjacent the center of the rear end 21 of the platform 16, and a by-pass 22 leading from the outlet of the pump 13 to the tank 14. A pressure gauge 23 conveniently is inserted in the outlet pipe 19 and a check valve 24 is provided in the by-pass 22.

Other elements of the combination include a plurality of conduits and manifolds 26, 27, 28 and 29 which are in communication with one another and with the blower 12 and which conduct the air generated thereby, the conduit 28 and manifolds 27 and 29 conveniently being arranged along the rear end 21 and one side of the platform 16. Means, such as a butterfly valve 30 which is controlled by a lever 31, is provided in the conduit 26 in order to regulate the air flow therethrough, and a pressure gauge 32 conveniently is inserted in the manifold 27. A plurality of outlets 33 and 34 are formed in the conduit 29, and connections, such as flexible hoses or conduits 36, are provided to communicate with the conduit 29 through the outlets 33 and 34. When not in use, these outlets can be closed by means of a standard plug 37.

In accordance with my invention, a Venturi nozzle 38 is detachably secured to each of the flexible conduits 36 by suitable connections, such as a standard coupling comprising a collar 39 in threaded engagement with a nipple 41, the latter being fixedly secured to the conduit 36. Means are provided for introducing the insecticidal material into the air stream which passes through the nozzle. These means preferably include a flexible conduit or hose 42 which is connected to the end of the outlet pipe 19 of the pump 13 and also to a header 43 by means of a pipe connection 44. (See Figures 6 and 7.) A manually operable valve, controlled by the lever 46, for regulating the flow of the insecticidal liquid, is interposed between the header and connection 44. The means for introducing the liquid into the air stream passing through the nozzle also preferably include a plurality of tubes 47 which pierce the nozzle 38 and extend within the nozzle with their axes parallel to the longitudinal axis of the nozzle. Each of the tubes 47 conveniently is formed to a length requisite for termination thereof at the center of the constricted portion or throat 48 of the nozzle. This construction and the provision of a plurality of tubes is desirable in order that not only will the liquid be introduced at the point of highest velocity of the air stream, but also that the liquid will be distributed in the stream at such point of highest velocity. It is to be noted that the pump 13 carries the material to the nozzles 38 under just sufficient pressure head to reach the same. While I have shown and described the means for introducing the insecticidal material to but one nozzle 38, it is to be understood that similar means are provided for introducing the material to other nozzles which may be employed.

In treating peas for the control of pea aphis, the apparatus hereinabove described can be employed for either liberating and directing a fog-like mist consisting of air and a concentrated liquid insecticide, or a concentrated aqueous solution of a toxic material, such as nicotine, over the plants whereby the same is substantially entirely enveloped by the fog. If desired, an admixture of a concentrated liquid insecticide and a powdered toxic material can be liberated over the plants. To provide for a thorough admixture of the toxic material and the insecticide before introduction thereof into the air stream, the conduit 26 can be tapped and air led to the tank 14 and bubbled through the liquid insecticide and powdered material therein to thoroughly agitate the same. This is effected by providing a pipe connection 49, of relatively small diameter (see Figure 1), which communicates with the conduit 26 and leads into the lower part of the tank 14.

For treating grapevines in the control of grape leaf hoppers, I have provided a slightly modified embodiment of the apparatus illustrated in Figure 1. In this embodiment (see Figures 2 and 3), the conduit 28 and manifold 29 can be dispensed with and the end of the manifold 27 can be closed. The air generated by the blower 12 is conducted through the conduit 26 and manifold 27 and thence to the nozzles 38 (not illustrated in Figures 2 and 3), through manifolds 51, 52 and 53 which extend from the platform 16 and which are provided respectively with outlets 54, 56 and 57. Additional outlets, of course, can be provided if desired at suitable places, such as an outlet 58 in the manifold 27. When not in use, any one of the several outlets can be fitted with a standard plug 59. Suitable braces, such as the rods 61 and 62, are provided for holding the conduits 51, 52 and 53 in extended positions and over the vines to be treated. It is to be understood that means, similar to the means described in connection with the apparatus illustrated in Figure 1, are provided in this modification for carrying and introducing the insecticidal material into the air streams at the nozzles 38. With apparatus of the character just above described, each grapevine of a row thereof can be subjected to and enveloped by the fog liberated from the nozzles 38, as illustrated in Figure 3.

The modification of my apparatus which is illustrated in Figures 4 and 5 is especially adapted for the treatment of crops, such as beets, peas, and other truck crops, for exterminating leaf hoppers, thrips and aphis. In this modification, I provide a canopy 63 which conveniently is supported on the frame at the front of the vehicle employed in carrying the apparatus. Instead of supporting and arranging the air-conducting manifolds and conduits upon and along the side and rear of a truck body platform, as shown in Figure 1, I support a header manifold 64 and a conduit 66 upon the front and side frames respectively of the vehicle, the manifold 64 and conduit 66 being in communication with one another and with the manifold 27. Air, which is generated by the blower 12, is conducted through the manifold 27, conduit 66 and header 64 and passes through outlets 67 and 68 provided in the header manifold 64. Flexible pipes or hoses 36 and Venturi nozzles 38, as described above, are connected with these outlets and are disposed adjacent the top and rear of the canopy 63. I have found that two nozzles can be employed effectively to give the desired results. The insecticidal material is carried to the nozzles 38 and introduced and distributed in the air streams with means similar to that illustrated in Figures 1, 6 and 7, and hereinabove described. A fog-like insecticidal mist consisting of air and either a concentrated insecticidal liquid separately or in combination with a powdered toxic material is liberated from each nozzle but is confined by the canopy 63 rather than liberated into free air. Further, the nozzles 38 are directed toward each other so that the paths of each stream across one another adjacent the nozzles to produce a boiling, turbulent fog within the confines of the canopy, the fog moving in vortical paths. The vehicle carrying the apparatus can be propelled over the tract of pest-infested crop and successive areas of the tract progressively subjected to the confined fog-like insecticidal mist.

While I have described the invention for applying materials to pest-infested or diseased growth in connection with ground machines, the invention can be embodied in airplane adaptations. For example, a tank for carrying the insecticidal material can be mounted in a suitable place in the aircraft and means, in conjunction with the slip stream of the aircraft, can be associated with the tank to produce and liberate the fog-like mist.

The herein described apparatus has been successfully employed in the control of grape leaf hoppers and also for the control of beet leaf hoppers. The modification illustrated in Figure 2 of the drawings was used in combating the grape leaf hopper and I employed as the insecticidal material a composition consisting of 85%, by weight, of an oil having a boiling point range (A. S. T. M.—100.23) of 350 to 525 degrees Fahrenheit and having an unsulphonated residue of approximately 98%, together with 15%, by weight, of an oil of a viscosity of 100 seconds Saybolt at 100° Fahrenheit and having an unsulphonated residue of 100%. To each gallon of this mixture I added an extract from approximately one-half pound of pyrethrum flowers. The apparatus was supported on an automotive truck, was placed in operation and an area of vines traversed at the rate of about one acre of vines in approximately ten minutes. In this traverse of the area of vines aproximately five and one-half gallons of the material were used per acre. The fog-like mists liberated from the nozzles floated for appreciable distances and persisted for an appreciable period of time. The mist enveloped the vines and permeated the atmosphere which surrounded the same, and nymphs which clung to the vines as well as adult hoppers which flew therefrom were contacted and killed. Thin, uniform films of the insecticidal material were found to be deposited on all portions of the vines including both sides of the foliage thereof. Ninety to ninety-two percent of the hoppers on the vines and in the regions surrounding the same were killed by one traverse of the vineyard.

The embodiment of my invention which is illustrated in Figures 4 and 5 of the drawings was employed in treating beets for the control of the beet leaf hoppers. As illustrated, the apparatus includes a canopy under which liberated fog-like mists crossing the paths of one another were more or less confined, the canopy being open at the bottom. The apparatus was supported on an automotive truck, was set in operation and the truck moved over an area of the vegetation at the rate of approximately one acre of vegetation in ten or twelve minutes. A relatively high percentage of kill was had and the amount of material used per acre was small.

The apparatus of my invention can be employed for controlling many different varieties of parasiticidal pests and growth diseases and affords economy and time and labor as well as material utilized in the treatment of infested or diseased growth. Further, use of the apparatus will not result in a drenching of the growth and consequent injury thereof, and a plurality of trees or plants in an area thereof can be simultaneously treated so as to receive an adequate and effective deposit of insecticidal or fungicidal material.

I claim:

A portable unit for use in controlling crop pests, the unit comprising a vehicle having a frame, driving means for said vehicle, a canopy supported on said frame and extending beyond said frame and said vehicle, said canopy having a length lateral with respect to the direction of movement of the vehicle which is substantially greater than its width, a plurality of nozzles supported beneath said canopy in a space near the medial portion thereof which constitutes a minor part of the entire space enclosed by the canopy, means for causing a stream of air to flow through each of said nozzles at a relatively high velocity and under a relatively low pressure, and means for introducing and distributing an insecticidal liquid material in said air stream, the discharge from the nozzles being directed generally laterally with respect to the direction of movement of the vehicle whereby fog-like mists containing air and microscopic particles of said material are liberated from said nozzles to produce a boiling, turbulent fog within the confines of said canopy and which progresses towards the spaces within the ends of the canopy to envelope plants therein.

WILLIAM B. PARKER.